United States Patent

Lan

[19]

[11] Patent Number: 5,928,017
[45] Date of Patent: Jul. 27, 1999

[54] EXTERNALLY CONNECTED EXPANSION DEVICE OF PORTABLE COMPUTER

[75] Inventor: Chuan-Chi Lan, Taipei, Taiwan

[73] Assignee: Compal Electronics, Inc., Taipei, Taiwan

[21] Appl. No.: 09/079,271

[22] Filed: May 15, 1998

[51] Int. Cl.[6] .................................................. H01R 13/62
[52] U.S. Cl. .......................................... 439/159; 361/686
[58] Field of Search ............................ 439/159; 361/686, 361/684

[56] References Cited

U.S. PATENT DOCUMENTS 5,535,093  7/1996  Noguchi ................................... 361/686

Primary Examiner—Steven L. Stephan
Assistant Examiner—Javaid Nasri
Attorney, Agent, or Firm—Bacon & Thomas, PLLC

[57] ABSTRACT

An externally connected expansion device of portable computer. The expansion device includes an engaging unit and an outward pushing unit. The expansion device has a forward extending seat body disposed with an engaging block. When the portable computer is connected with the expansion device, the engaging block is first lowered and then lifted. After the portable computer is connected with the expansion device, the top section of the engaging block is inserted into an engaging hole formed at rear end of the bottom of the portable computer to engage the portable computer with the expansion device. Two sides of front end of the expansion device are disposed with pushing members drivingly connected with a handle. When it is desired to separate the portable computer from the expansion device, the top section of the engaging block is first sunk into the seat body and then a user can pull the handle to force the pushing members to push the portable computer out of the expansion device. A magnetic control switch is used to control whether the handle can be operated.

20 Claims, 6 Drawing Sheets

EXTERNALLY CONNECTED EXPANSION DEVICE OF PORTABLE COMPUTER

BACKGROUND OF THE INVENTION

The present invention relates to an externally connected expansion device of portable computer, and more particularly to an engaging unit and an outward pushing unit of the expansion device.

It is known that in portable computers such as on-knee type computer and notebook type computer, expansion devices such as docking or replicator are used to expand the function of the portable computer. Such expansion devices are equipped with various kinds of engaging unit and outward pushing unit for engaging with and pushing out the portable computer.

SUMMARY OF THE INVENTION

It is a primary object of the present invention to provide an engaging unit and outward pushing unit of an externally connected expansion device of portable computer. The engaging unit enables the expansion device to more reliably engage with the portable computer. The outward pushing unit serves to more easily push the portable computer out of the expansion device. In addition, once the portable computer is engaged with the expansion device, a better ensurance effect is achieved. According to the above object, the engaging unit of the externally connected expansion device of the present invention is applicable to a portable computer having an engaging hole at rear end of the bottom. A bottom of the expansion device is disposed with a seat body for connecting with the portable computer. The engaging unit includes: a receiving frame downward extending from rear end of top face of the seat body, the receiving frame having an open top section and a close bottom section, the open top section forming an opening on top face of the seat body, a first cut section being formed on a periphery of the opening and extending outward and downward to the bottom of the receiving frame, whereby a lateral edge thereof is formed with a downward extending slot; a first resilient member installed from upper side to lower side into the receiving frame with the bottom of the first resilient member contacting with the close bottom section thereof; an engaging block having a lateral edge disposed with a first projection corresponding to the first cut section, whereby when placing the engaging block into the receiving frame from upper side to lower side, the first projection is extended out of the slot of lateral edge of the receiving frame and slided downward, the bottom of the engaging block contacting with the top of the first resilient member which resiliently forces the engaging block to protrude the top section of the engaging block beyond the opening of top face of the seat body, the top section of the engaging block corresponding to the engaging hole of the portable computer to be inserted therein; and a lifting member disposed on lateral edge of the opening of the seat body, including a pushing bar having a front end extending to front end of the seat body and a rear end extending to the bottom of the expansion device. The rear end portion of the pushing bar has a downward extending pressing section having a substantially V-shaped bottom edge and upward extending first and second ends. The first end is adjacent to the front end of the pushing bar, while the second end is adjacent to the rear end of the push bar. The bottom face of the pressing section abuts against upper side of the first projection of the engaging block. A second resilient member provides a forward pulling force for the pushing bar, whereby in normal state, the first projection is positioned at the second end of the pressing section.

The portable computer is guided by the seat body to electrically connect a connector of the portable computer with a connector of the expansion device. The receiving frame of the engaging unit has a second cut section formed on the periphery of the opening of the receiving frame. The second cut section extends outward and downward to the bottom of the receiving frame to form a slot of lateral edge thereof. The lateral edge of the engaging block is disposed with a second projection corresponding to the second cut section. When the engaging block is installed into the receiving frame, the first and second projections are extended out of the slots of the receiving frame and slided downward therealong. The outward pushing unit is disposed in the expansion device and the seat body for separating the portable computer from the expansion device. The outward pushing unit includes: a first and a second support frames which are respectively fixed on left and right sides of the interior of the expansion device and the seat body, the first support frame from left side to right side being disposed with a first pivot section and a downward extending post, a right side of the second pivot section from right side to left side being disposed with a second pivot section, a third pivot section and a downward extending post; a slide frame having a first slide slot at front end and two second slide slots on left and right sides, the center of the slide frame being formed with an opening, a rear end of the second slide slots being disposed with downward extending posts, the second slide slots of the slide frame being fitted with the posts of the first and second support frames with the posts slidable within the second slide slots and with the central opening positioned around the opening of the receiving frame; a first and a second supports each having a first and a second ends, the first end being disposed with a third slide slot fitted with the posts of the slide frame, a support pivot section being disposed between the first and second ends to pivotally connect with the first and second pivot sections of the first and second support frames, the second end being disposed with an upward extending pushing member, the pushing member being positioned in the expansion device with its pushing face adjacent to the connecting faces of the expansion device and the seat body; a handle having a first and a second ends, the first end being disposed with an upward extending post fitted with the first slide slot of the slide frame, a handle pivot section being disposed between the first and second ends to pivotally connect with the third pivot section of the second support frame, the second end of the handle extending out of the seat body; and a rejecting member fixed on lateral edge of the central opening of the slide frame, the rejecting member having a downward extending pressing section, the bottom edge of the pressing section having a low plane front end and an upward inclined rear end, the bottom face of the pressing section abutting against upper side of the second projection of the engaging block, whereby when the portable computer is engaged with the expansion device, the second projection is positioned at highest point of the bottom edge of the pressing section.

The present invention can be best understood through the following description and accompanying drawings, wherein:

DETAILED DESCRIPTION OF THE PREFERRED EMBODIMENTS

Figure 1B:
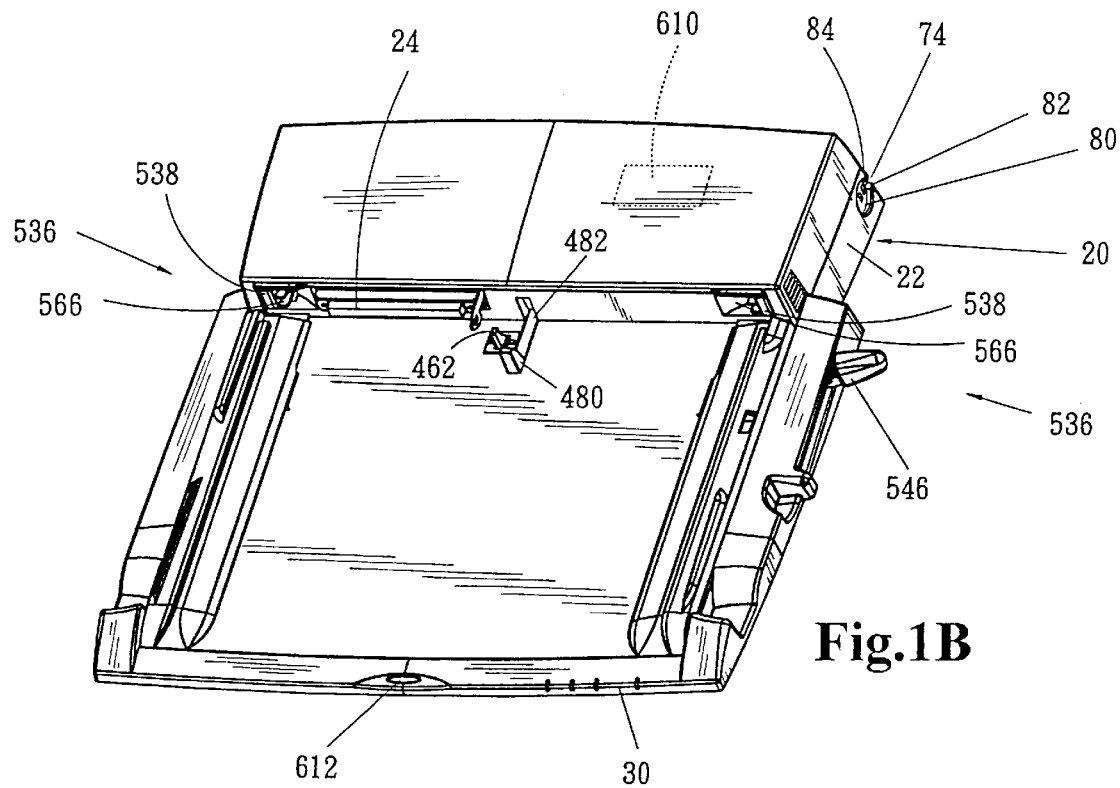
FIGS. 1A and 1B are perspective views of the portable computer and the engaging unit and outward pushing unit of the expansion device of the present invention.
Figure 1A:
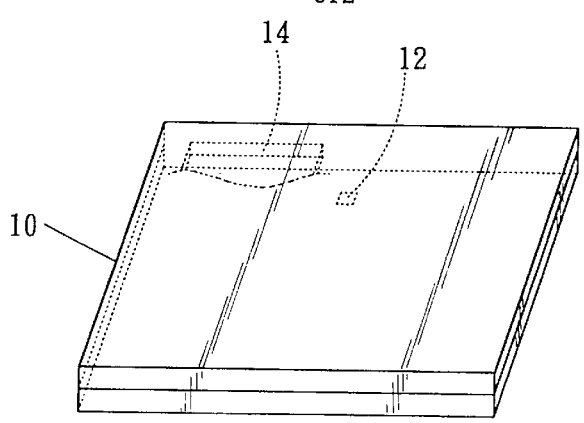

Please refer to FIGS. 1A and 1B. The portable computer 10 is formed with an engaging hole 12 at rear end of the bottom thereof. The front end of the base 22 of the expansion device 20 is disposed with a seat body 30. The portable computer 10 is guided by the seat body 30 to electrically connect its connector 14 with a connector 24 of the expansion device 20.

The engaging unit 40 and outward pushing unit 50 of the present invention are installed in the expansion device 20 and the seat body 30 and partially exposed outside the expansion device 20 and the seat body 30.

Figure 2:
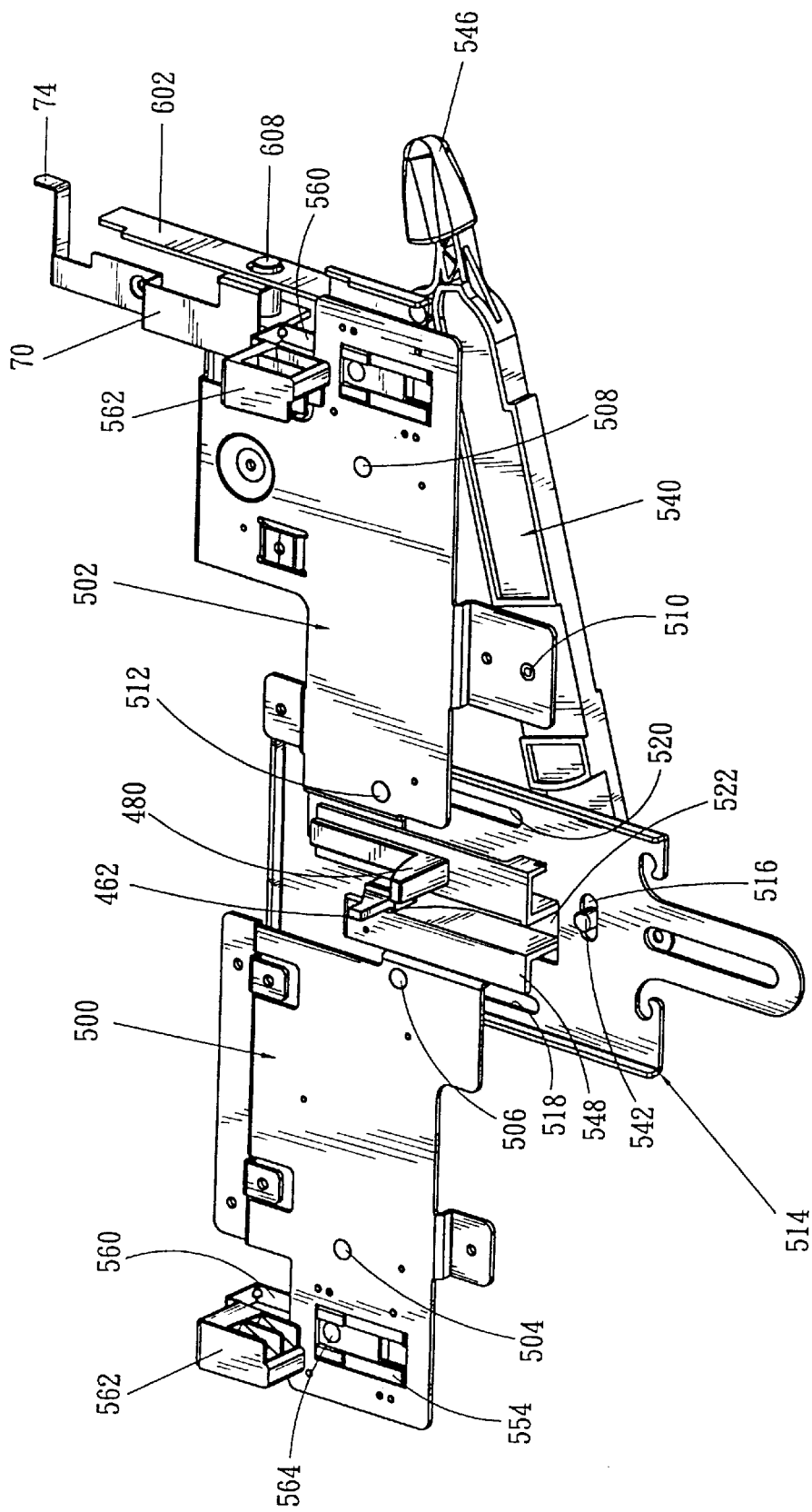
FIG. 2 is a perspective assembled view of the engaging unit and outward pushing unit of the expansion device of the present invention.
Figure 3:
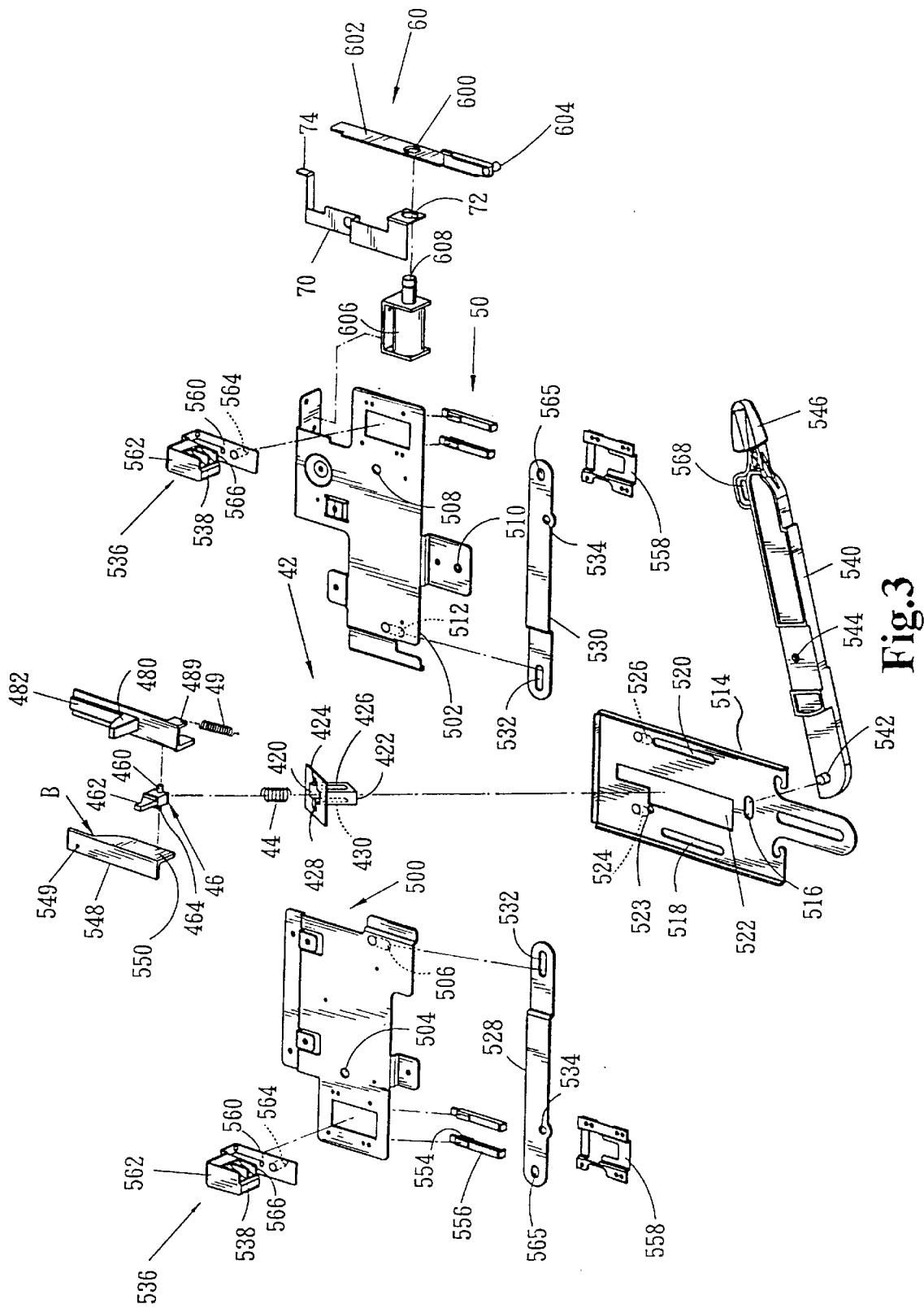
FIG. 3 is a perspective exploded view according to FIG. 2.

Please refer to FIGS. 2 and 3 in which the expansion device 20 and the seat body 30 are removed to show the engaging unit and outward pushing unit of the expansion device. The engaging unit includes a receiving frame 42 disposed on the seat body 30 and downward extending from rear end of top face of the seat body 30. The receiving frame 42 has an open top section 420 and a close bottom section 422. The open top section 420 forms an opening on top face of the spat body 30. A first cut section 424 is formed on the periphery of the opening and extends outward and downward to the bottom of the receiving frame 42, whereby a lateral edge thereof is formed with a slot 426 extending from upper side to lower side. A first resilient member 44 is installed from upper side to lower side into the receiving frame 42 with the bottom of the first resilient member 44 contacting with the close bottom section 422 thereof. An engaging block 46 is installed in the receiving frame 42. A lateral edge of the engaging block 46 is disposed with a first projection 460 corresponding to the first cut section 424. When placing the engaging block 46 into the receiving frame 42 from upper side to lower side, the first projection 460 is aligned with the first cut section 424 and extended out of the slot 426 and slided downward. At this time, the bottom of the engaging block 46 contacts with the top of the first resilient member 44 which resiliently forces the engaging block 46 to protrude the top section 462 of the engaging block 46 beyond the opening of top face of the seat body 30. The top section 462 of the engaging block corresponds to the engaging hole 12 of the portable computer 10 to be inserted therein.

Figure 4:
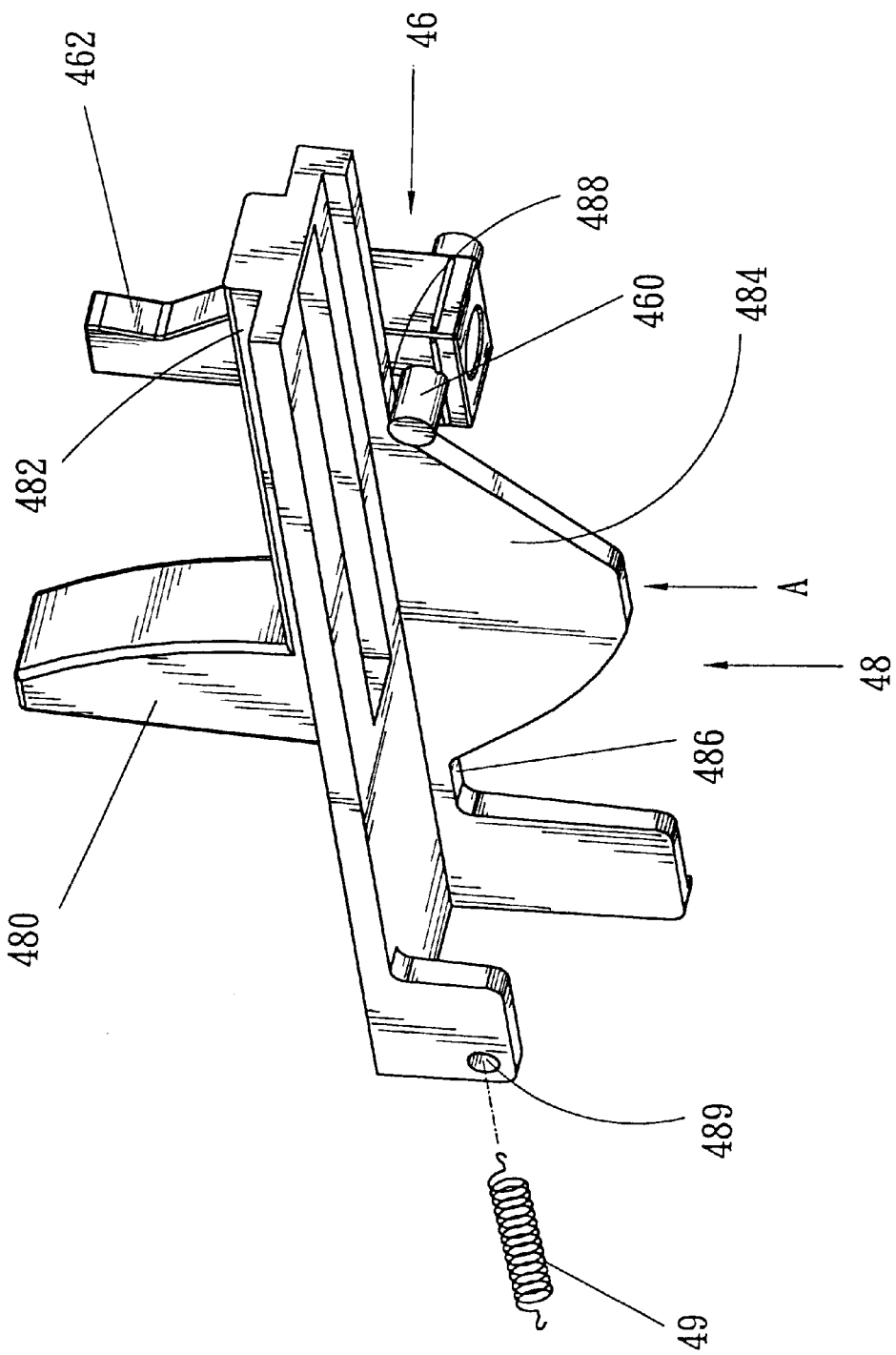
FIG. 4 is a perspective view showing the relationship between the engaging block and the lifting member of the present invention.

A lifting member 48 is disposed on lateral edge of the opening of the seat body 30 for lifting and lowering the engaging block 46. FIG. 4 shows the relationship between the engaging block 46 and the lifting member 48. The lifting member 48 mainly includes a pushing bar 480 having a front end extending to front end of the seat body 30 and a rear end extending to the bottom of the expansion device 20. The rear end portion 482 of the pushing bar has a downward extending pressing section 484 having a substantially V-shaped bottom edge and upward extending first and second ends 486, 488. The first end 486 is adjacent to the front end 480 of the pushing bar, while the second end 488 is adjacent to the rear end 482 of the push bar. The bottom face of the pressing section 484 abuts against upper side of the first projection 460 of the engaging block. One end of a second resilient member 49 such as a spring is hooked in a hanging hole 489 formed at front end of the pushing bar, the other end thereof is fixed in the seat body 30 (not shown) in front of the pushing bar 480 to provide a forward pulling force for the pushing bar, whereby in normal state, the first projection 460 is positioned at the second end 488 of the pressing section 484.

Accordingly, when the rear end of the portable computer 10 via the seat body 30 is connected with the expansion device 20, the rear end of the portable computer 10 will touch the pushing bar 480 of the lifting member to force the pushing bar and drive the pressing section 484. Referring to FIG. 4, the first projection 460 is moved from the second end 488 of the pressing section to the first end 486. When the first projection is moved from the second end 488 to the lowest point of the V-shaped bottom edge as shown by arrow A of FIG. 4, the first projection 460 will drive the engaging block 46 to continuously descend until the top 462 of the engaging block is sunk into the opening of the seat body, whereby the rear end of the portable computer can slide over the opening.

When moved from the lowest point of the V-shaped bottom edge to the first end 486, the restoring force of the first resilient member 44 will push the engaging block 46 to continuously ascend until the top 462 of the engaging block extends into the engaging hole 12 of the rear end of the portable computer to complete the engagement. At this time, the connector 14 of the portable computer is electrically connected with the connector 24 of the expansion device 20. The advantage of the present invention resides in that unless the top 462 of the engaging block is lowered, the connector 14 of the portable computer cannot be horizontally disconnected from the connector 24 of the expansion device 20. Therefore, a better ensurance is achieved.

Please further refer to FIG. 3. The outward pushing unit 50 of the present invention corresponds to the engaging unit 40 and includes a second cut section 428 formed on the periphery of the opening of the receiving frame 42. The second cut section 428 extends outward and downward to the bottom of the receiving frame to form a slot 430 of lateral edge thereof. The lateral edge of the engaging block 46 is disposed with a second projection 464 corresponding to the second cut section 428. When the engaging block 46 is installed into the receiving frame 42, the first and second projections 460, 464 are aligned with the first and second cut sections 424, 428 and extended out of the slots 426, 430 and slided downward therealong.

In addition, the present invention includes a first and a second support frames 500, 502 which are respectively fixed on left and right sides of the interior of the expansion device 20 and the seat body 30 (not shown). This can be achieved by the conventional measure. The first support frame 500 from left side to right side is disposed with a first pivot section 504 and a downward extending post 506. The right side of the second support frame 502 from right side to left side is disposed with a second pivot section 508, a third pivot section 510 and a downward extending post 512.

The present invention further includes a slide frame 514 having a first slide slot 516 at front end and two second slide slots 518, 520 on left and right sides. The center of the slide frame is formed with an opening 522. The rear ends of the second slide slots 518, 520 are disposed with downward extending posts 524, 526. The second slide slots 518, 520 of the slide frame 514 are fitted with the posts 506, 512 of the first and second support frames with the posts 506, 512 slidable within the second slide slots 518, 520. At this time, the central opening 522 is positioned around the opening of the receiving frame 42.

Each of the first and second supports 528, 530 has a first and a second ends. The first end is disposed with a third slide slot 532 fitted with the posts 524, 526 of the slide frame. A support pivot section 534 is disposed between the first and second ends to pivotally connect with the first and second pivot sections 504, 508 of the first and second support frames. The second end is disposed with an upward extending pushing member 536. As shown in FIG. 1, the pushing member 536 is positioned in the expansion device 20 with its pushing face 538 adjacent to the connecting faces of the expansion device 20 and the seat body 30.

The present invention further includes a handle 540 having a first and a second ends. The first end is disposed with an upward extending post 542 fitted with the first slide slot 516 of the slide frame. A handle pivot section 544 is disposed between the first and second ends to pivotally connect with the third pivot section 510 of the second support frame. The second end 546 of the handle extends out of the seat body 30.

The present invention further includes a rejecting member 548 fixed on lateral edge of the central opening 522 of the slide frame. In this embodiment, the thread hole of the rejecting member 548 is aligned with the thread hole 523 of lateral edge of the central opening of the slide frame and tightened by a bolt (not shown). The rejecting member has a downward extending pressing section 550. The bottom edge of the pressing section 550 has a low plane front end and an upward inclined rear end. The bottom face of the pressing section 550 abuts against upper side of the second projection 464 of the engaging block, whereby when the portable computer 10 is engaged with the expansion device 20, the second projection 464 is positioned at highest point of the bottom edge of the pressing section as shown by arrow B of FIG. 3.

Accordingly, when the second end 546 of the handle is pulled forward, via the handle pivot section 544, the slide frame 514 is moved rearward. At this time, the rejecting member 548 is driven to move rearward, making the second projection 464 move along the bottom edge of the pressing section 550 to drive the engaging block 46 to move downward. After the top 462 of the engaging block is separated from the engaging hole 12 of the portable computer, the first ends of the first and second support frames are rearward moved through the support pivot section 534, making the pushing member 536 of the second end of the first and second supports move forward and extend out of two sides of the expansion device 20 so as to push two sides of rear end of the portable computer and separate the same from the expansion device 20.

As shown in FIG. 3, the front end of left side of the first support frame 500 and the front end of right side of the second support frame 502 respectively extend left and right. The extension sections are respectively disposed with a forward and a rearward slide rail means 552. The slide rail means 552 includes two slide rails 556 having slide channels 554. The slide rails 556 via a cover body 558 are screwed on bottom face of extension sections of the first and second support frames 500, 502 for a slide plate 560 slidably connected in the slide channels 554 of the slide rail means 552. The rear end of the slide plate 560 extends upward and the top of the extension section is disposed with a block body 562 having a pushing face 538. The bottom face of the slide plate 560 is disposed with a downward extending post 564. The second ends of the first and second supports 528, 530 are respectively disposed with a fourth slide slot 565 for the post 564 of the slide plate to fit therein.

The pushing member 536 can be modified by directly mounting the block body 562 at the second ends of the first and second supports 528, 530 by welding, riveting, screwing, etc. In this modification, in the case that the expansion device 20 and the left side of the seat body 30 are disposed with first pivot section 504 and downward extending post 506 as those of the first support frame 500, and the right side is disposed with second pivot section 508, third pivot section 510 and downward extending post 512 as those of the second support frame 502, the first and second support frames 500, 502 can be omitted. Furthermore, the block body 562 is formed with several passages 566 communicating the inner side with outer side of the expansion device 20, whereby the heat therein can be radiated outside through the passages 566.

The present invention further includes a detent means 60 disposed in the expansion device 20 and the seat body 30. The detent means includes a detent member 602 having a through hole 600 and connecting with the second end 546 of the handle. In this embodiment, as shown in FIG. 3, one end of the detent member 602 is disposed with a downward extending post 604 and the second end 546 of the handle is disposed with a fifth slide slot 568 for slidably fitting the post 604 therein. A magnetic control switch 606 has an extensible shaft rod 608 aligned with the through hole 600 of the detent member. A control circuit 610 of FIG. 1 is electrically connected with a push button 612 and the switch 606. The control circuit 610 is responsive to the input signal of the push button 612 to control the extension of the shaft rod 608. In this embodiment, the detent means 60 is used when the portable computer is activated and externally connected with the expansion device 20. At this time, the shaft rod 608 of the switch is in an extending state and engaged in the through hole 600 of the detent member so that the handle 540 is stopped by the detent member from being forward pulled. When the control circuit 610 detects that the push button 612 is depressed, the display of the portable computer 10 immediately shows the input password (not shown). In the case that the control circuit 610 detects that the user inputs correct password, the shaft rod 608 is controlled to retract. At this time, the handle 540 can be pulled forward to push the portable computer 10 out of the expansion device 20 as aforesaid.

Moreover, in order to still enable the user to push out the portable computer 10 from the expansion device 20 in the case that the switch 606 fails due to power cut, the detent means further includes a shifting member 70. One end of the shifting member is formed with a through hole 72 positioned between and aligned with the shaft rod 608 and the through hole 600 of the detent member. The other end 74 thereof extends out of the expansion device 20 as shown in FIG. 1. In the case of power cut, the user can shift the end 74 of the shifting member to force the through hole 600 of the detent member to separate from the shaft rod 608, permitting the handle 540 to be normally forward pulled.

Figure 5:
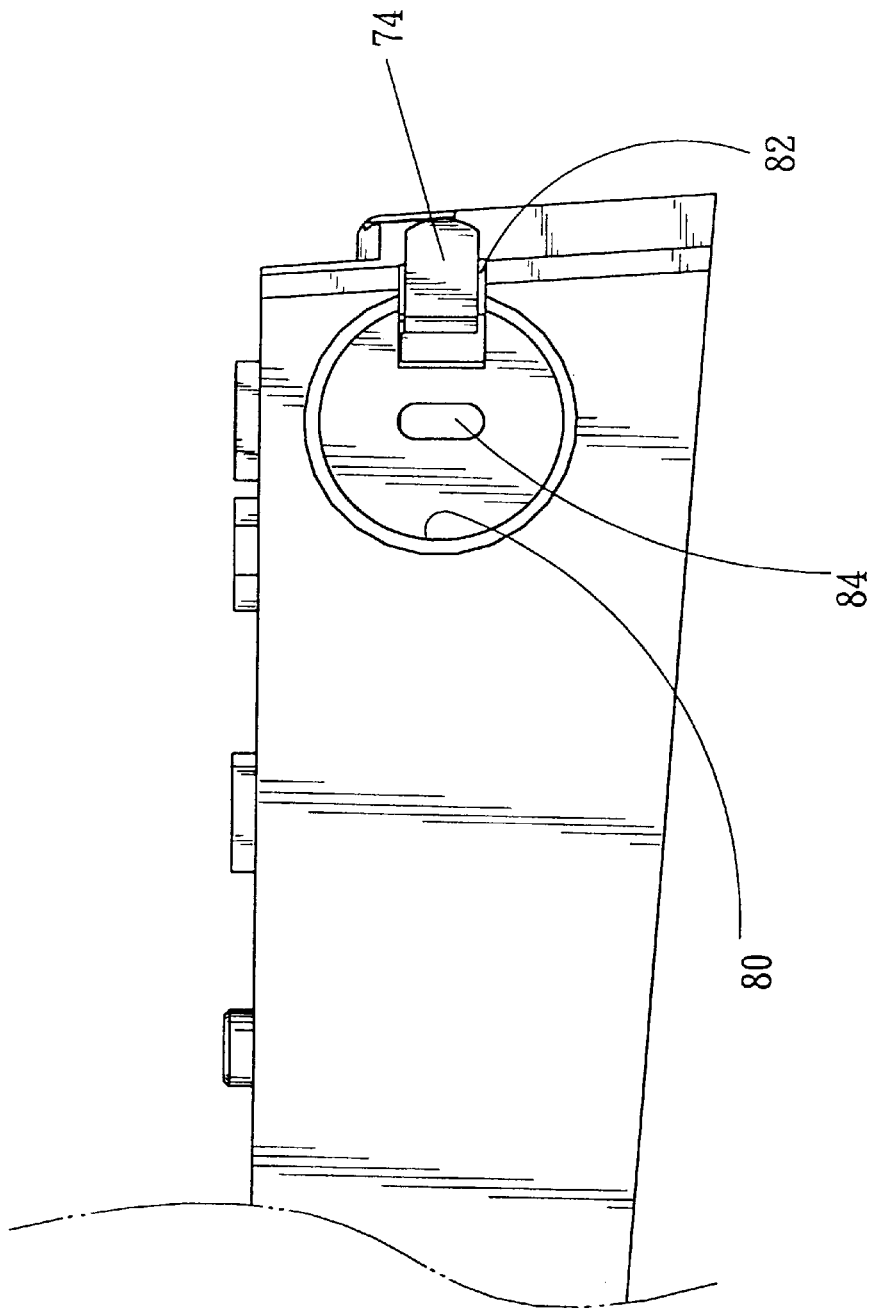
FIG. 5 is a right side view of a part of FIG. 1.
Figure 6:
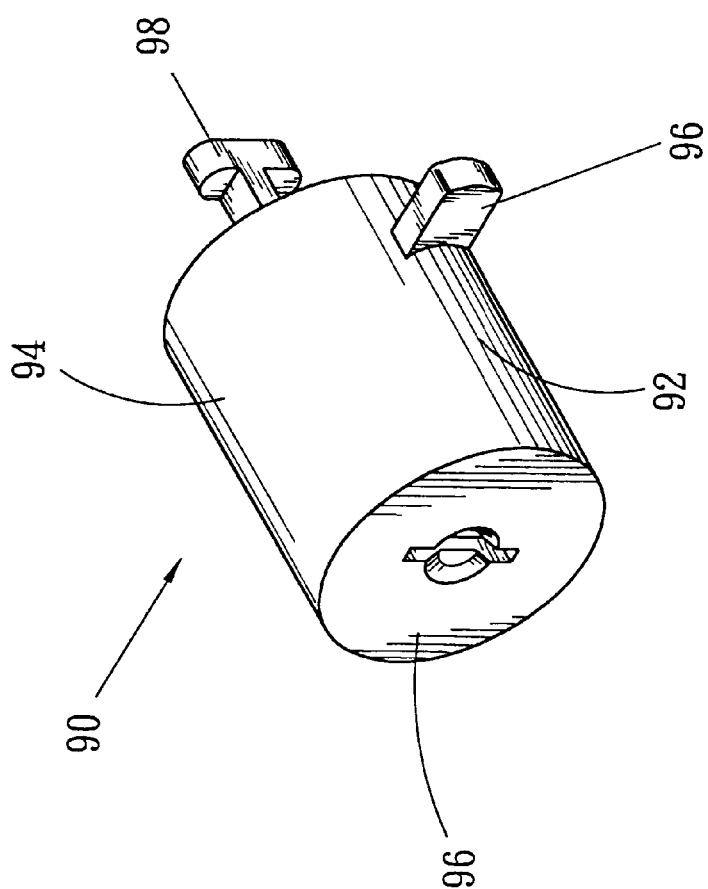
FIG. 6 is a perspective view of the locking device of the present invention.

In addition, in order to prevent the shifting member 70 from being shifted by unauthorized person, the outer wall of the expansion device 20 is formed with a socket 80 at the outer end 72 of the shfiting member 70 as shown in FIG. 1. The periphery of the socket 80 is formed with a locating notch 82. The center of the socket is formed with a rectangular through hole 84. Please refer to FIG. 5 which is a right side view of a part of FIG. 1 and refer to FIG. 6 which shows a locking device. The locking device 90 includes a lock head 94 the periphery of which is disposed with a projecting block 92. The axis of the lock head is disposed with a lock core 96 extending out of the lock head 94. The extending end of the lock core is disposed with a rectangular lock bar 98 corresponding to the rectangular through hole 84. The lock bar 98 is aligned with and inserted into the rectangular through hole 84 with the projecting block 92 aligned with the locating notch 82 and inserted in the socket 80. After the outer end 72 is shielded by the locking device, a key can be inserted into the lock core 96 and then rotated to disalign the lock bar 98 from the rectangular through hole 84 to lock the locking device. Unless the locking device 90 is unlocked, the shifting member 70 cannot be shifted.

It should be noted that the above description and accompanying drawings are only used to illustrate some embodiments of the present invention, not intended to limit the scope thereof. Any modification of the embodiments should fall within the scope of the present invention.

What is claimed is:

1. An externally connected expansion device of portable computer, a front end of a bottom of the expansion device being disposed with a seat body, the portable computer being guided by the seat body to electrically connect a connector of the portable computer with a connector of the expansion device, an inner left side of the expansion device and the seat body being disposed with a first pivot section and a downward extending post and an inner right side thereof being disposed with a second pivot section, a third pivot section and a downward extending post, the expansion device comprising an outward pushing unit including:

a slide frame having a first slide slot at front end and two second slide slots on left and right sides, a rear ends of the second slide slots being disposed with downward extending posts, the second slide slots of the slide frame being fitted with the posts of the expansion device and seat body with the posts slidable within the second slide slots;

a first and a second supports each having a first and a second ends, the first end being disposed with a third slide slot fitted with the posts of the slide frame, a support pivot section being disposed between the first and second ends to pivotally connect with the first and second pivot sections of the expansion device and seat body, the second end being disposed with an upward extending pushing member, the pushing member being positioned in the expansion device with its pushing face adjacent to the connecting faces of the expansion device and the seat body; and a handle having a first and a second ends, the first end being disposed with an upward extending post fitted with the first slide slot of the slide frame, a handle pivot section being disposed between the first and second ends to pivotally connect with the third pivot section of the expansion device and seat body, the second end of the handle extending out of the seat body, whereby when the second end of the handle is pulled forward, via the handle pivot section, the slide frame is moved rearward and at this time, the first ends of the first and second support frames are rearward moved through the support pivot section, making the pushing member of the second end of the first and second supports move forward and extend out of two sides of the expansion device so as to push two sides of rear end of the portable computer and separate the same from the expansion device.

2. An externally connected expansion device as claimed in claim 1, wherein the pushing member is a block body.

3. An externally connected expansion device as claimed in claim 2, wherein the block body is formed with multiple passages communicating outer side of the expansion device with inner side thereof.

4. An externally connected expansion device of portable computer, a front end of a bottom of the expansion device being disposed with a seat body, the portable computer being guided by the seat body to electrically connect a connector of the portable computer with a connector of the expansion device, the expansion device comprising an outward pushing unit disposed in the expansion device and the seat body for separating the portable computer from the expansion device, the pushing unit including:

a first and a second support frames which are respectively fixed on left and right sides of the interior of the expansion device and the seat body, the first support frame from left side to right side being disposed with a first pivot section and a downward extending post, a right side of the second pivot section from right side to left side being disposed with a second pivot section, a third pivot section and a downward extending post;

a slide frame having a first slide slot at front end and two second slide slots on left and right sides, a rear end of the second slide slots being disposed with downward extending posts, the second slide slots of the slide frame being fitted with the posts of the first and second support frames with the posts slidable within the second slide slots;

a first and a second supports each having a first and a second ends, the first end being disposed with a third slide slot fitted with the posts of the slide frame, a support pivot section being disposed between the first and second ends to pivotally connect with the first and second pivot sections of the first and second support frames, the second end being disposed with an upward extending pushing member, the pushing member being positioned in the expansion device with its pushing face adjacent to the connecting faces of the expansion device and the seat body; and a handle having a first and a second ends, the first end being disposed with an upward extending post fitted with the first slide slot of the slide frame, a handle pivot section being disposed between the first and second ends to pivotally connect with the third pivot section of the second support frame, the second end of the handle extending out of the seat body, whereby when the second end of the handle is pulled forward, via the handle pivot section, the slide frame is moved rearward and at this time, the first ends of the first and second support frames are rearward moved through the support pivot section, making the pushing member of the second end of the first and second supports move forward and extend out of two sides of the expansion device so as to push two sides of rear end of the portable computer and separate the same from the expansion device.

5. An externally connected expansion device as claimed in claim 4, wherein the pushing member is a block body.

6. An externally connected expansion device as claimed in claim 4, wherein the front end of left side of the first support frame and the front end of right side of the second support frame respectively extend left and right, the extension sections being respectively disposed with a forward and a rearward slide rails, the second ends of the first and second supports being respectively disposed with a fourth slide slot, the pushing member including a slide plate, a front end of the slide plate being inserted into the slide rail, a rear end of the slide plate extending upward and the top of the extension section being disposed with a block body, a bottom face of the slide plate being disposed with a downward extending post for fitting into the fourth slide slot of the first and second supports.

7. An externally connected expansion device as claimed in claim 5, wherein the block body is formed with multiple passages communicating outer side of the expansion device with inner side thereof.

8. An externally connected expansion device of portable computer, comprising an engaging unit applicable to portable computer having an engaging hole at rear end of the bottom, a bottom of the expansion device being disposed with a seat body for connecting with the portable computer, the engaging unit including:

a receiving frame downward extending from rear end of top face of the seat body, the receiving frame having an open top section and a close bottom section, the open top section forming an opening on top face of the seat body, a first cut section being formed on a periphery of the opening and extending outward and downward to the bottom of the receiving frame, whereby a lateral edge thereof is formed with a downward extending slot;

a first resilient member installed from upper side to lower side into the receiving frame with the bottom of the first resilient member contacting with the close bottom section thereof;

an engaging block having a lateral edge disposed with a first projection corresponding to the first cut section, whereby when placing the engaging block into the receiving frame from upper side to lower side, the first projection is extended out of the slot of lateral edge of the receiving frame and slided downward, the bottom of the engaging block contacting with the top of the first resilient member which resiliently forces the engaging block to protrude the top section of the engaging block beyond the opening of top face of the seat body, the top section of the engaging block corresponding to the engaging hole of the portable computer to be inserted therein; and a lifting member disposed on lateral edge of the opening of the seat body, including a pushing bar having a front end extending to front end of the seat body and a rear end extending to the bottom of the expansion device, the rear end portion of the pushing bar having a downward extending pressing section having a substantially V-shaped bottom edge and upward extending first and second ends, the first end being adjacent to the front end of the pushing bar, while the second end being adjacent to the rear end of the push bar, the bottom face of the pressing section abutting against upper side of the first projection of the engaging block, a second resilient member providing a forward pulling force for the pushing bar, whereby in normal state, the first projection is positioned at the second end of the pressing section, whereby when the rear end of the portable computer via the seat body is connected with the expansion device, the rear end of the portable computer will touch the pushing bar of the lifting member to force the pushing bar and drive the pressing section, the first projection being moved from the second end of the pressing section to the first end, when the first projection is moved from the second end to the lowest point of the V-shaped bottom edge, the first projection driving the engaging block to continuously descend until the top of the engaging block is sunk into the opening of the seat body, whereby the rear end of the portable computer can slide over the opening, when moved from the lowest point of the V-shaped bottom edge to the first end, the restoring force of the first resilient member pushing the engaging block to continuously ascend until the top of the engaging block extends into the engaging hole of the rear end of the portable computer.

9. An externally connected expansion device as claimed in claim 8, wherein a front end of a bottom of the expansion device is disposed with a seat body, the portable computer being guided by the seat body to electrically connect a connector of the portable computer with a connector of the expansion device, the receiving frame of the engaging unit having a second cut section formed on the periphery of the opening of the receiving frame, the second cut section extending outward and downward to the bottom of the receiving frame to form a slot of lateral edge thereof, the lateral edge of the engaging block being disposed with a second projection corresponding to the second cut section, whereby when the engaging block is installed into the receiving frame, the first and second projections are extended out of the slots of the receiving frame and slided downward therealong, the outward pushing unit being disposed in the expansion device and the seat body for separating the portable computer from the expansion device, the outward pushing unit including:

a first and a second support frames which are respectively fixed on left and right sides of the interior of the expansion device and the seat body, the first support frame from left side to right side being disposed with a first pivot section and a downward extending post, a right side of the second pivot section from right side to left side being disposed with a second pivot section, a third pivot section and a downward extending post;

a slide frame having a first slide slot at front end and two second slide slots on left and right sides, the center of the slide frame being formed with an opening, a rear end of the second slide slots being disposed with downward extending posts, the second slide slots of the slide frame being fitted with the posts of the first and second support frames with the posts slidable within the second slide slots and with the central opening positioned around the opening of the receiving frame;

a first and a second supports each having a first and a second ends, the first end being disposed with a third slide slot fitted with the posts of the slide frame, a support pivot section being disposed between the first and second ends to pivotally connect with the first and second pivot sections of the first and second support frames, the second end being disposed with an upward extending pushing member, the pushing member being positioned in the expansion device with its pushing face adjacent to the connecting faces of the expansion device and the seat body;

a handle having a first and a second ends, the first end being disposed with an upward extending post fitted with the first slide slot of the slide frame, a handle pivot section being disposed between the first and second ends to pivotally connect with the third pivot section of the second support frame, the second end of the handle extending out of the seat body; and a rejecting member fixed on lateral edge of the central opening of the slide frame, the rejecting member having a downward extending pressing section, the bottom edge of the pressing section having a low plane front end and an upward inclined rear end, the bottom face of the pressing section abutting against upper side of the second projection of the engaging block, whereby when the portable computer is engaged with the expansion device, the second projection is positioned at highest point of the bottom edge of the pressing section, whereby when the second end of the handle is pulled forward, via the handle pivot section, the slide frame is moved rearward and at this time, the rejecting member is driven to move rearward and the second projection is moved along the bottom edge of the pressing section to drive the engaging block to move downward, after the top of the engaging block is separated from the engaging hole of the portable computer, the first ends of the first and second support frames are rearward moved through the support pivot section, making the pushing member of the second end of the first and second supports move forward and extend out of two sides of the expansion device so as to push two sides of rear end of the portable computer and separate the same from the expansion device.

10. An externally connected expansion device as claimed in claim 9, wherein the front end of left side of the first support frame and the front end of right side of the second support frame respectively extend left and right, the extension sections being respectively disposed with a forward and a rearward slide rails, the second ends of the first and second supports being respectively disposed with a fourth slide slot, the pushing member including a slide plate, a front end of the slide plate being inserted into the slide rail, a rear end of the slide plate extending upward and the top of the extension section being disposed with a block body, a bottom face of the slide plate being disposed with a downward extending post for fitting into the fourth slide slot of the first and second supports.

11. An externally connected expansion device as claimed in claim 9, wherein the pushing member is a block body.

12. An externally connected expansion device as claimed in claim 9, further comprising a detent means disposed in the expansion device and the seat body, the detent means including a detent member having a through hole and connecting with the second end of the handle, a magnetic control switch having an extensible shaft rod aligned with the through hole of the detent member, and a control circuit electrically connected with a push button and the switch, the control circuit being responsive to the input signal of the push button to control the extension of the shaft rod.

13. An externally connected expansion device as claimed in claim 11, wherein the block body is formed with several passages communicating inner side of the expansion device with outer side thereof.

14. An externally connected expansion device as claimed in claim 8, wherein a front end of a bottom of the expansion device is disposed with a seat body, the portable computer being guided by the seat body to electrically connect a connector of the portable computer with a connector of the expansion device, an inner left side of the expansion device and the seat body from left side to right side being disposed with a first pivot section and a downward extending post, a right side thereof from right side to left side being disposed with a second pivot section, a third pivot section and a downward extending post, the receiving frame of the engaging unit having a second cut section formed on the periphery of the opening of the receiving frame, the second cut section extending outward and downward to the bottom of the receiving frame to form a slot of lateral edge thereof, the lateral edge of the engaging block being disposed with a second projection corresponding to the second cut section, whereby when the engaging block is installed into the receiving frame, the first and second projections are extended out of the slots of the receiving frame and slided downward therealong, the expansion device further comprising an outward pushing unit including:

a slide frame having a first slide slot at front end and two second slide slots on left and right sides, the center of the slide frame being formed with an opening, a rear end of the second slide slots being disposed with downward extending posts, the second slide slots of the slide frame being fitted with the posts of the expansion device and the seat body with the posts slidable within the second slide slots and with the central opening positioned around the opening of the receiving frame;

a first and a second supports each having a first and a second ends, the first end being disposed with a third slide slot fitted with the posts of the slide frame, a support pivot section being disposed between the first and second ends to pivotally connect with the first and second pivot sections of the expansion device and the seat body, the second end being disposed with an upward extending pushing member, the pushing member being positioned in the expansion device with its pushing face adjacent to the connecting faces of the expansion device and the seat body;

a handle having a first and a second ends, the first end being disposed with an upward extending post fitted with the first slide slot of the slide frame, a handle pivot section being disposed between the first and second ends to pivotally connect with the third pivot section of the expansion device and the seat body, the second end of the handle extending out of the seat body; and a rejecting member fixed on lateral edge of the central opening of the slide frame, the rejecting member having a downward extending pressing section, the bottom edge of the pressing section having a low plane front end and an upward inclined rear end, the bottom face of the pressing section abutting against upper side of the second projection of the engaging block, whereby when the portable computer is engaged with the expansion device, the second projection is positioned at highest point of the bottom edge of the pressing section, whereby when the second end of the handle is pulled forward, via the handle pivot section, the slide frame is moved rearward and at this time, the rejecting member is driven to move rearward and the second projection is moved along the bottom edge of the pressing section to drive the engaging block to move downward, after the top of the engaging block is separated from the engaging hole of the portable computer, the first ends of the first and second support frames are rearward moved through the support pivot section, making the pushing member of the second end of the first and second supports move forward and extend out of two sides of the expansion device so as to push two sides of rear end of the portable computer and separate the same from the expansion device.

15. An externally connected expansion device as claimed in claim 14, wherein the pushing member is a block body.

16. An externally connected expansion device as claimed in claim 15, wherein the block body is formed with several passages communicating inner side of the expansion device with outer side thereof.

17. An externally connected expansion device as claimed in claim 14, further comprising a detent means disposed in the expansion device and the seat body, the detent means including a detent member having a through hole and connecting with the second end of the handle, a magnetic control switch having an extensible shaft rod aligned with the through hole of the detent member, and a control circuit electrically connected with a push button and the switch, the control circuit being responsive to the input signal of the push button to control the extension of the shaft rod.

18. An externally connected expansion device as claimed in claim 17, wherein the detent means is used when the portable computer is activated and externally connected with the expansion device, the shaft rod of the switch being in an extending state and engaged in the through hole of the detent member so that the handle is stopped by the detent member from being forward pulled, when the control circuit detects that the push button is depressed, the display of the portable computer immediately showing the input password, in the case that the control circuit detects that the user inputs correct password, the shaft rod being controlled to retract, at this time, the handle being able to be pulled forward to push the portable computer out of the expansion device.

19. An externally connected expansion device as claimed in claim 17, wherein the detent means further includes a shifting member, one end of the shifting member being formed with a through hole positioned between and aligned with the shaft rod and the through hole of the detent member, the other end thereof extending out of the expansion device, whereby in the case of power cut, a user can shift the outer end of the shifting member to force the through hole of the detent member to separate from the shaft rod, permitting the handle to be normally forward pulled.

20. An externally connected expansion device as claimed in claim 19, wherein the outer wall of the expansion device is formed with a socket at the outer end of the shfiting member, the periphery of the socket being formed with a locating notch, the center of the socket being formed with a rectangular through hole, the detent means further including a locking device having a lock head a periphery of which is disposed with a projecting block, the axis of the lock head being disposed with a lock core extending out of the lock head, the extending end of the lock core being disposed with a rectangular lock bar corresponding to the rectangular through hole, the lock bar being aligned with and inserted into the rectangular through hole with the projecting block aligned with the locating notch and inserted in the socket, after the outer end is shielded by the locking device, a key being able to be inserted into the lock core and then rotated to disalign the lock bar from the rectangular through hole to lock the locking device.

* * * * *